Nov. 21, 1961 — H. LINDEMANN — 3,010,051

ELECTRIC SHAFT APPARATUS

Filed May 20, 1958 — 3 Sheets-Sheet 3

INVENTOR
HANS LINDEMANN
BY Dike and Craig
ATTORNEYS

United States Patent Office 3,010,051
Patented Nov. 21, 1961

3,010,051
ELECTRIC SHAFT APPARATUS
Hans Lindemann, Bielefeld, Germany, assignor to Th. Calow & Co. Maschinenfabrik u. Eisengiesserei, Bielefeld, Germany
Filed May 20, 1958, Ser. No. 736,559
Claims priority, application Germany May 27, 1957
6 Claims. (Cl. 317—6)

The present invention relates to "electric shafts" or selsyn systems, that is, to apparatus for electrically transmitting the torque and for synchronizing the rate of speed of drive shafts, particularly shafts which are used for driving machine tools, for example, the two clamping and feed carriages of a surface finishing machine, such as a centerless bar-turning, peeling or skimming machine employing revolving cutter heads. Such an apparatus generally consists of a transmitter unit which is electrically connected by cables to at least one receiver unit for electrically transmitting the torque of one drive shaft from one point to another shaft located at a different and more remote point, and for insuring that both shafts will always rotate at the identical speed.

A presumption for the proper operation of such "electric shaft" is that the load on the driven machine will always be uniform and that the speed range of this machine will not be too large. If, however, intermittent shock loads occur which sometimes are unavoidable in the operation of the machine, for example, when engaging and disengaging the movement of a feed carriage of a surface finishing machine, the transmitter and receiver units of such apparatus will fall out of step with each other. Prior to this invention, this could only be avoided by subjecting such electrical shafts to only relatively small loads which, however, meant that only a small part of the capacity of the respective machine could be utilized.

It is an object of the present invention to provide an apparatus of the type mentioned above in which each transmitter unit is associated with at least one receiver unit, and to provide suitable means for preventing the two units from falling out of step with each other. Another important object of the invention is to simplify the construction and operation of such "electric shafts" and to reduce the cost of manufacture thereof.

An essential feature of the present invention consists in providing the receiver unit comprising the receiver rotor and the machine element to be driven, for example, a clamping and feed carriage, with an attenuator, for example, of the type of an eddy current brake, which comprises a flywheel normally rotating at a rate of speed proportional to that of the receiver rotor. The shaft of the receiver rotor may thus be rigidly connected to the shaft of the driven machine element, and these two shafts which form an integral unit may then be provided with an attenuator device comprising a revolving magnetic field or magnet wheel which is carried by, and is rotatable with the shafts, and a winding which is mounted in a flywheel mass capable of moving rotationally relative to the revolving field. The winding with its flywheel mass is therefore mounted so as to be freely rotatable on the shaft which interconnects the receiver rotor with the driven part. The function of the attenuator will remain identical even though it may be mounted, for example, on the end of the shaft of the receiver unit which is not connected to the driven machine element or on the end of the shaft of the machine element itself which is not connected to the receiver unit. In order to eliminate the need for a rapid-traverse motor which has so far been required for the rapid movement of the driven machine element, for example, the feed carriage of a surface finishing machine, such as a centerless bar-turning peeling or skimming machine or the like, the stator winding of the receiver motor may for such purposes be disconnected and shorted. For reversing the direction of rotation of the driven machine element, it is merely necessary to reverse the polarity of the three-phase current which is supplied to the rotor of the receiver unit.

The present invention thus affords for the first time an effective use of electric shafts for driving machine tools. This has previously been impossible because of the difficulties mentioned above which according to the invention may now be fully overcome.

Further objects, features, and advantages of the present invention will be apparent from the following detailed description thereof, particularly when read with reference to the accompanying drawings which diagrammatically illustrate three different embodiments of the present invention, in which—

FIGURE 2 shows an electric shaft similar to that illustrated in FIGURE 1, but in which one transmitter unit is associated with two receiver units; while

Figure 1:
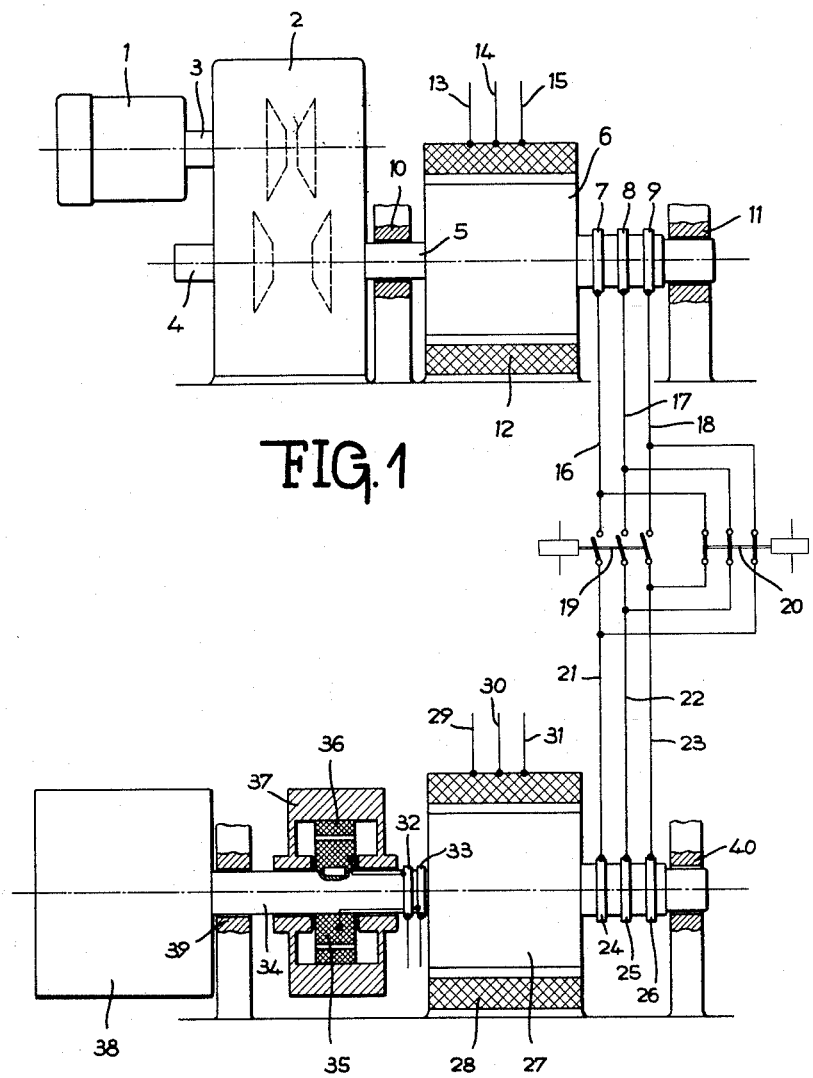
FIGURE 1 shows the essential parts of an electric shaft according to the invention with only one transmitter unit and one receiver unit in which the receiver unit is provided with an attenuator in the form of an eddy current brake device, one part of which is rigidly connected to the output shaft of the receiver rotor, while the other part is freely rotatable on this shaft.

Referring to the drawings, FIGURE 1 illustrates the principle of the present invention and therefore shows the electric shaft as only consisting of a single transmitter unit and a single receiver unit. A motor 1 through its shaft 3 drives an infinitely variable transmission 2 which has two output shafts 4 and 5. Output shaft 5 is preferably connected through a suitable clutch, not shown, to a rotor 6 of a transmitter unit, the shaft of which is provided with three slip rings 7, 8, and 9 for use in a three-phase alternating current selsyn system. The shafts are rotatably mounted in bearings 10 and 11. Rotor 6 of the transmitter unit is associated with a stator 12, the windings of which are excited by being supplied with a three-phase line current through conductors 13, 14, and 15. Slip rings 7, 8, and 9 are connected through conductors 16, 17, and 18 with conductors 21, 22, and 23, respectively, by means of a reversing switch 19, 20 which is preferably controlled electromagnetically. Conductors 21, 22, and 23 are connected to slip rings 24, 25, and 26, respectively, which are mounted on the shaft of a receiver rotor 27, 28. The rotor 27 of this unit is surrounded by a stator 28 which is also excited by being supplied with said three-phase line current through conductors 29, 30, and 31. Stator 28 is provided with suitable means, not shown, for disconnecting it from the line current and for short-circuiting it. On the other side of the rotor shaft 34, two slip rings 32 and 33 are provided which are adapted to supply the necessary field current from an outside source of direct current to a revolving field or electromagnet wheel 35. In place of a magnet wheel which is supplied with direct current, it is also possible to use a wheel equipped with permanent magnets. The electromagnets or the permanent magnets are associated with a short-circuited winding 36 which is secured to a flywheel 37 which is freely rotatable on shaft 34. Shaft 34 is rigidly connected to the driven part 38 and rotatably mounted in bearings 39 and 40. The magnet wheel 35 in cooperation with the winding 36 constitute the attenuation device according to the invention and operates in the manner of an eddy-current clutch by coupling the shaft 34 electromagnetically with the flywheel mass 37.

If shaft 3 is driven by motor 1, output shafts 4 and 5 of transmission 2 will rotate at the same rate of speed so that the transmitter rotor 6 will also rotate at the same speed. If reversing switches 19, 20 are in the position as illustrated in FIGURE 1, receiver rotor 27 will rotate at the same speed as the transmitter rotor 6 and in the direction as set by switches 19 and 20. This applies likewise to the driven parts, for example, the driving means of one of the two feed carriages of a surface finishing machine.

Figure 2:
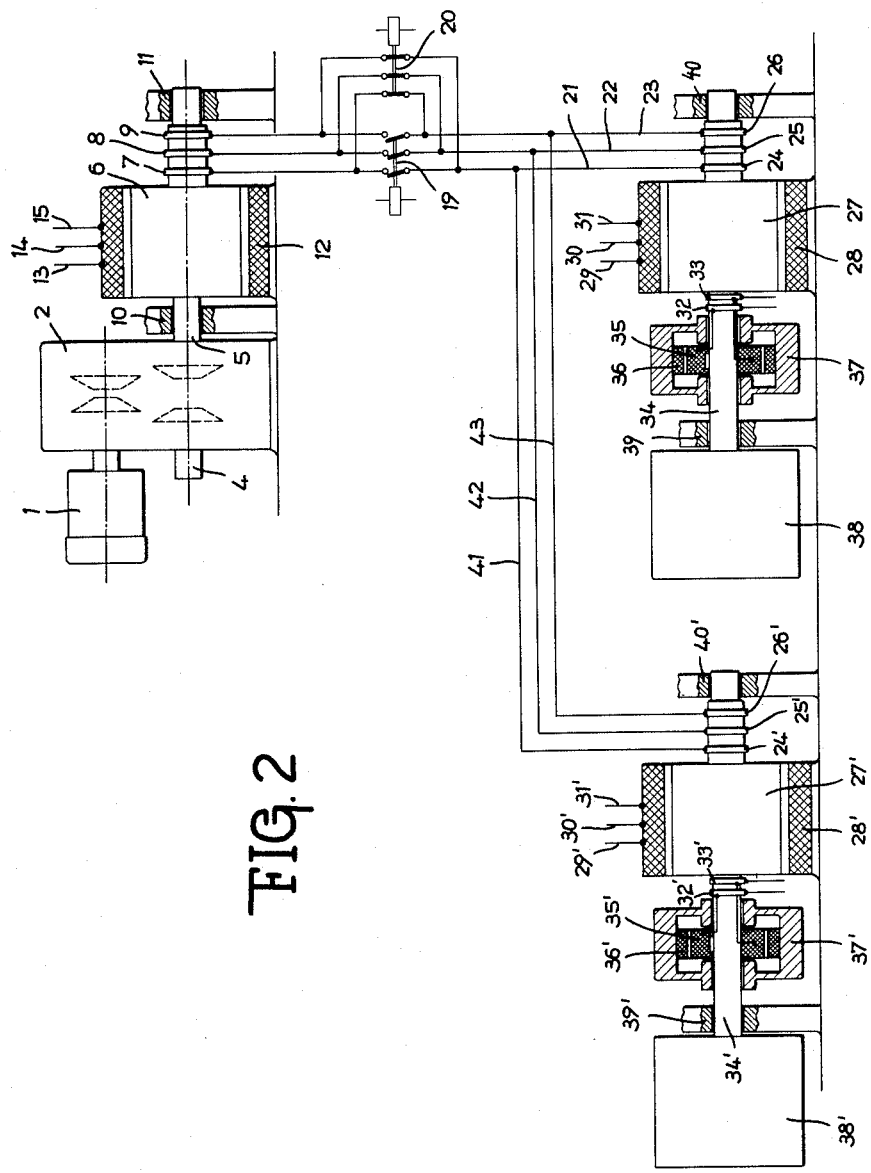

If two machine elements are to be driven synchronously, it is advisable to provide one transmitter unit in association with two receiver units, each of which is connected to one machine element to be driven and operatively associated with a separate eddy current brake serving as an attenuator. This may be accomplished in a very simple manner, as illustrated in FIGURE 2, by connecting the conductors 21, 22, and 23 as shown in FIGURE 1 by means of conductors 41, 42, and 43 to the slip rings 24', 25', and 26', respectively, of the rotor of a second receiver unit 27', 28' which is supplied with said three-phase line current through the conductors 29', 30' and 31'. Corresponding to the other receiver unit with the rotor 27 and stator 28, this receiver unit likewise includes the elements 32', 33', 35', 36', 37', and 38' which are associated with or connected to shaft 34'.

Figure 3:
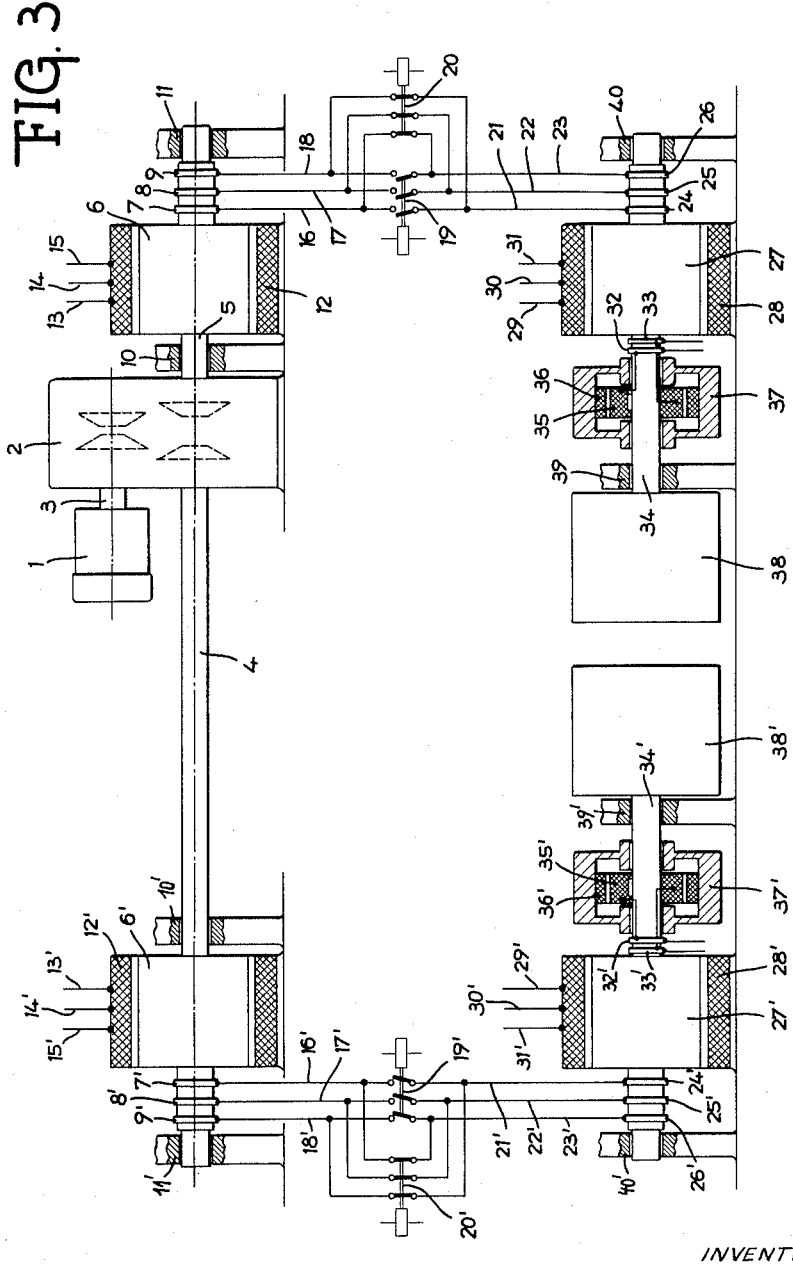
FIGURE 3 shows another electric shaft similar to the one illustrated in FIGURE 1, but in which two transmitter units which are driven by a single motor are each associated with one receiver unit.

As illustrated in FIGURE 3, it is also possible to use a single main motor 1 for driving two transmitter units 6, 12 and 6', 12', each of which is associated with a receiver unit 27, 28, or 27', 28', respectively. The second output shaft 4 of transmission 2 is then rigidly connected to the rotor 6' of the second transmitter unit, and the latter is connected in the same manner as shown in FIGURE 1 and by means of corresponding elements to the second receiver unit 27', 28' and a second driven machine element 38' which are likewise associated with an eddy-current device 35', 36', 37'.

In the event that the driven elements, for example, the two clamping and feed carriages of a surface finishing machine, such as a centerless bar-turning, peeling or skimming machine, should be engageable and disengageable independently of each other, each carriage should be provided with a separate clutch. In the embodiments of the invention as illustrated in the drawings, such a clutch should therefore be provided on each of the driven machine elements 38 and 38'.

If in either FIGURE 2 or FIGURE 3 the transmitter and receiver units of both electric shafts rotate and one of the feed carriages is engaged or disengaged, or if during the movement of one feed carriage intermittent shock loads occur, each shock will be absorbed and compensated by the eddy-current attenuator since upon any tendency of the magnet wheel 35 or 35' to slow down relative to the flywheel 37 or 37', respectively, maintaining its speed equal to the normal speed of shaft 34 or 34', respectively, the eddy currents induced in the respective windings 36, 36' will set up a torque counteracting such slow down. Such intermittent shocklike loads will therefore no longer affect the electric shaft or selsyn system, and the transmitter and receiver units thereof will no longer fall out of step with each other.

In order to be able to move the feed carriages of a finishing machine or the feeding means of another machine tool very rapidly from one position to another, additional rapid-traverse motors are usually provided. Such additional motors may be omitted if conductors 29, 30, 31 or 29', 30', 31' are disconnected from the line current and shorted. Rotor 27 or 27' will then rotate at a speed which is increased by the rate of speed of the field of the stator 28 or 28', provided that the output shafts 4 and 5 rotate in a direction opposite to that of the rotary fields of the transmitter stators 12 or 12'. Depending upon the position of the reversing switches 19, 20, a rapid forward or reverse feed of the driven parts may thus be attained, and it is merely necessary to operate those switches in the required sequence. If the polarity of the three-phase current which is supplied to one or the other receiver rotor 27 or 27' is to be reversed, it is necessary first to disconnect and short-circuit the respective receiver stator 28 or 28'.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In selsyn systems for transmitting the torque produced by at least one transmitter unit to at least one receiver unit and for synchronizing the rotary speed of the receiver unit with that of the transmitter unit, and in which the receiver unit has a driven shaft positively connected with the shaft of a mechanism to be driven, in combination, a flywheel member mounted coaxially with said driven shaft for being freely rotatable about said shaft; and eddy-current means for electromagnetically coupling said driven shaft with said flywheel member, said eddy-current means comprising a magnetic field member fixed to said driven shaft for rotation therewith so that the magnetic field of said magnetic field member rotates in unison with said driven shaft, and an induction member mounted on said flywheel member in a position opposite said magnetic field member in such a manner that by any rotational movement of said flywheel and induction members relative to said magnetic field member and driven shaft eddy-currents are induced by said magnetic field in said induction member resulting in a torque between said flywheel member and said driven shaft tending to counteract and attenuate such relative rotational movement.

2. An apparatus as claimed in claim 1, wherein said selsyn system is of the three-phase type and comprises in the transmitter unit as well as in the receiver unit a three-phase stator winding and a three-phase rotor winding, feed line connections being provided for supplying said stator windings of said units with exciter current from a three-phase power line, and wherein three-phase conductors are provided for interconnecting said rotor windings of said units.

3. An apparatus as claimed in claim 2, including switch means arranged in said feed line connections for disconnecting said stator winding of said receiver unit from said power line, and for short-circuiting said stator winding of said receiver unit.

4. An apparatus as claimed in claim 2, including reversing switch means arranged in said three-phase conductors interconnecting said rotors for reversing the phase-relation between said rotors and thereby reversing the direction of rotation of said receiver unit relative to that of said transmitter unit.

5. An apparatus as claimed in claim 2, including switch means arranged in said feed line connection for disconnecting said stator winding of said receiver unit from said power line, and for short-circuiting said stator winding of said receiver unit, and including reversing switch means arranged in said three-phase conductors interconnecting said rotors for reversing the phase-relation between said rotors and thereby reversing the direction of rotation of said receiver unit relative to that of said transmitter unit.

6. In selsyn systems for transmitting the torque produced by at least one transmitter unit to at least one receiver unit and for synchronizing the rotary speed of the receiver unit with that of the transmitter unit, and in which the receiver unit has a driven shaft member positively connected with the shaft of a mechanism to be driven, in combination, a flywheel member mounted coaxially with said driven shaft for being freely rotatable about said shaft; and eddy-current means for electromagnetically coupling said driven shaft member with said flywheel member, said eddy-current means comprising magnetic field means fixed to one of said members for rotation therewith so that the magnetic field of said magnetic field means rotates in unison with said member to which it is fixed, and induction means mounted on the other one of said members in a position opposite said magnetic field means in such a manner that by any rotational movement of said induction means relative to said magnetic field means due to a difference between the rotary speed of said flywheel and driven shaft member, eddy-currents are induced by said magnetic field in said induction means resulting in a torque between said flywheel member and said driven shaft member tending to counteract and to attenuate such relative rotational movement, whereby said receiver unit is prevented from falling out-of-step with said transmitter unit in the event of temporary increases of load on the receiver unit.

References Cited in the file of this patent

UNITED STATES PATENTS

| | | |
|---|---|---|
| 1,350,214 | Eisenmann | Aug. 17, 1920 |
| 1,356,226 | Severy | Oct. 19, 1920 |
| 2,105,897 | Towne | Jan. 18, 1938 |